(12) United States Patent
Potter et al.

(10) Patent No.: US 9,745,431 B2
(45) Date of Patent: Aug. 29, 2017

(54) BOPP FILM HAVING LOW SHRINKAGE

(71) Applicant: BOREALIS AG, Vienna (AT)

(72) Inventors: Gregory Potter, Linz (AT); Dietrich Gloger, Linz (AT); Thomas Horill, Gerasdorf (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/103,744

(22) PCT Filed: Dec. 18, 2014

(86) PCT No.: PCT/EP2014/078511
§ 371 (c)(1),
(2) Date: Jun. 10, 2016

(87) PCT Pub. No.: WO2015/091829
PCT Pub. Date: Jun. 25, 2015

(65) Prior Publication Data
US 2016/0311988 A1    Oct. 27, 2016

(30) Foreign Application Priority Data
Dec. 18, 2013 (EP) .................... 13198125

(51) Int. Cl.
| C08F 110/06 | (2006.01) |
| B29C 55/00 | (2006.01) |
| C08J 5/18 | (2006.01) |
| B29C 55/14 | (2006.01) |
| B29C 55/12 | (2006.01) |

(52) U.S. Cl.
CPC .............. *C08J 5/18* (2013.01); *C08F 110/06* (2013.01); *B29C 55/12* (2013.01); *B29C 55/14* (2013.01); *B29C 55/143* (2013.01); *C08F 2500/03* (2013.01); *C08F 2500/11* (2013.01); *C08F 2500/12* (2013.01); *C08F 2500/13* (2013.01); *C08F 2500/26* (2013.01); *C08J 2323/12* (2013.01)

(58) Field of Classification Search
CPC .. C08F 110/06; C08F 2500/26; B29C 55/143; B29C 55/14; B29C 55/12; C08L 23/12; C08L 2203/16; C08J 5/18
See application file for complete search history.

(56) References Cited

U.S. PATENT DOCUMENTS

| 4,311,660 | A | * | 1/1982 | Barham | .................. | B29C 71/02 |
| | | | | | | 156/229 |
| 4,405,775 | A | * | 9/1983 | Hashimoto | ........... | B29C 55/065 |
| | | | | | | 264/210.7 |
| 4,436,888 | A | * | 3/1984 | Copple | ................ | B29C 55/065 |
| | | | | | | 264/210.7 |
| 5,724,222 | A | * | 3/1998 | Hirano | ....................... | C08J 5/18 |
| | | | | | | 252/567 |
| 5,851,610 | A | * | 12/1998 | Ristey | ................... | B29C 55/143 |
| | | | | | | 264/288.4 |
| 6,063,482 | A | * | 5/2000 | Peiffer | .................... | B32B 27/32 |
| | | | | | | 264/173.15 |
| 6,071,598 | A | * | 6/2000 | Peiffer | .................... | B32B 27/32 |
| | | | | | | 264/173.15 |
| 6,085,982 | A | * | 7/2000 | Nakashima | ........... | G06F 1/3281 |
| | | | | | | 235/375 |
| 6,537,652 | B1 | * | 3/2003 | Kochem | .................... | C08J 5/18 |
| | | | | | | 264/173.19 |
| 7,132,065 | B2 | * | 11/2006 | Allen | .................... | B29C 55/165 |
| | | | | | | 264/2.7 |
| 7,235,618 | B2 | * | 6/2007 | Lin | ....................... | C08F 110/06 |
| | | | | | | 525/248 |
| 7,282,539 | B2 | * | 10/2007 | Kim | .......................... | C08J 5/18 |
| | | | | | | 525/191 |
| 7,309,740 | B2 | * | 12/2007 | Masuda | ............... | B29C 55/143 |
| | | | | | | 428/461 |
| 7,323,252 | B2 | * | 1/2008 | Obata | ..................... | B32B 27/32 |
| | | | | | | 428/516 |
| 7,420,022 | B2 | * | 9/2008 | Blackmon | ............. | C08F 4/6465 |
| | | | | | | 502/103 |
| 2003/0134062 | A1 | * | 7/2003 | Rajan | ...................... | B32B 27/08 |
| | | | | | | 428/34.9 |
| 2004/0191551 | A1 | * | 9/2004 | Ishii | ....................... | B32B 27/32 |
| | | | | | | 428/515 |
| 2006/0182987 | A1 | * | 8/2006 | Yu | ........................... | C08F 10/00 |
| | | | | | | 428/523 |
| 2006/0211801 | A1 | | 9/2006 | Miller et al. | | |

(Continued)

FOREIGN PATENT DOCUMENTS

| EP | 0 645 417 | 3/1995 |
| EP | 1 726 602 | 11/2006 |

(Continued)

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).

Busico et al., "Full Assignment of the $^{13}$C Nmr Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Cheng, "$^{13}$C NMR Analysis of Ethylene-Propylene Rubbers," *Macromolecules* 17:1950-1955 (1984).

Kakugo et al., "$^{13}$C NMR Determination of Monomer Sequence Distribution in Ethylene-Propylene Copolymers Prepared with σ-TiCl$_3$-Al(C$_2$H$_5$)$_2$Cl," *Macromolecules* 15:1150-1152 (1982).

(Continued)

*Primary Examiner* — Rip A Lee
(74) *Attorney, Agent, or Firm* — Leydig, Voit & Mayer, Ltd.

(57) ABSTRACT

The present invention relates to a new biaxially oriented polypropylene (BOPP) film, a process for the preparation of such film as well as the use of a polypropylene for the preparation of such film and an article comprising such film.

18 Claims, No Drawings

(56) References Cited

U.S. PATENT DOCUMENTS

| | | | | |
|---|---|---|---|---|
| 2007/0167576 A1* | 7/2007 | Kim | ............... | C08L 23/10 525/240 |
| 2008/0177018 A1* | 7/2008 | Cooper | ............... | C08F 10/06 526/348.1 |
| 2009/0305069 A1* | 12/2009 | Goeldel | ............... | C08L 23/10 428/516 |
| 2010/0056719 A1* | 3/2010 | Marzolla | ............... | C08J 5/18 525/53 |
| 2015/0267014 A1* | 9/2015 | Neissl | ............... | B29C 55/005 526/351 |
| 2016/0024641 A1* | 1/2016 | Monno | ............... | C08J 5/18 428/220 |

FOREIGN PATENT DOCUMENTS

| | | | | |
|---|---|---|---|---|
| EP | 1 883 080 | | 1/2008 | |
| EP | 1 990 353 | | 11/2008 | |
| JP | 57-103819 A | * | 6/1982 | ............ B29D 7/24 |
| JP | 8-92388 A | * | 4/1996 | ............ C08J 5/18 |
| JP | 8-230123 A | * | 9/1996 | ............ B32B 27/32 |
| JP | 10-67972 A | * | 3/1998 | ............ C09J 7/02 |
| JP | 2000-233478 A | * | 8/2000 | ............ B32B 27/32 |
| JP | 2000-263723 A | * | 9/2000 | ............ B32B 27/32 |
| JP | 2001-48998 A | * | 2/2001 | ............ C08J 5/18 |
| JP | 2001-114908 A | * | 4/2001 | ............ C08J 5/18 |
| JP | 2005-264151 A | * | 9/2005 | ............ C08J 5/18 |
| JP | 2007-169595 A | * | 7/2007 | ............ C08J 5/18 |
| WO | WO 2004/013193 | | 2/2004 | |
| WO | WO 2011/141380 | | 11/2011 | |
| WO | WO 2013/004507 | | 1/2013 | |
| WO | WO 2014/023603 | | 2/2014 | |
| WO | WO 2015/129851 A1 | * | 9/2015 | ............ C08J 5/18 |

OTHER PUBLICATIONS

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).
Resconi et al., "Selectivity in Propene Polymerization with Metallocene Catalysts," *Chem. Rev.* 100(4): 1253-1345 (2000).
Singh et al., "Triad sequence determination of ethylene-propylene copolymers—application of quantitative $^{13}$C NMR," *Polymer Testing* 28(5):475-479 (2009).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
European Patent Office, International Search Report in International Application No. PCT/EP2014/078511 (Mar. 11, 2015).
European Patent Office, Written Opinion in International Application No. PCT/EP2014/078511 (Mar. 11, 2015).
International Bureau of WIPO, International Preliminary Report on Patentability in International Application No. PCT/EP2014/078511 (Jun. 21, 2015).
European Patent Office, Extended European Search Report in European Application No. 13198125.0 (Apr. 15, 2014).
U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
U.S. Appl. No. 15/310,283, filed Nov. 10, 2016.

* cited by examiner

BOPP FILM HAVING LOW SHRINKAGE

CROSS-REFERENCE TO RELATED APPLICATIONS

This patent application is the U.S. national phase of International Application No. PCT/EP2014/078511, filed on Dec. 18, 2014, which claims the benefit of European Patent Application No. 13198125.0, filed Dec. 18, 2013, the disclosures of which are incorporated herein by reference in their entireties for all purposes.

The present invention relates to a new biaxially oriented polypropylene (BOPP) film, a process for the preparation of such film as well as the use of a polypropylene for the preparation of such film and an article comprising such film.

Biaxially oriented polypropylene (BOPP) films, also known as oriented polypropylene films, are used in a wide variety of technical applications such as packaging, tapes or capacitor films. However, due to the production of the BOPP film by sequential drawing in two orthogonal directions, at two different temperatures, the BOPP film processing introduces considerable anisotropy regarding several mechanical properties of the final BOPP film. In particular, the relaxation of the morphology upon heating causes shrinkage in both drawing directions. As a result, the shrinkage in machine direction (MD) is usually around 3.0 to 6.0% of the original size, while the lower shrinkage in transverse direction (TD) is usually around 0.5 to 1.5% of the original size.

However, it is desired that the shrinkage of a BOPP film is as low as possible, in order to ensure dimensional stability during post treatment and subsequent use of the final BOPP film.

Thus, there is still a need in the art for providing a biaxially oriented polypropylene (BOPP) film which avoids the foregoing disadvantages and especially allows for improving the shrinkage of such a film. In other words, it would be desirable to provide a biaxially oriented polypropylene (BOPP) film featuring a lower shrinkage compared to prior art biaxially oriented polypropylene (BOPP) films.

Accordingly, it is an object of the present invention to provide a biaxially oriented polypropylene (BOPP) film featuring a decreased shrinkage, while other mechanical properties such as stiffness are maintained.

The present invention is based on the finding that a biaxially oriented polypropylene film providing low shrinkage can be accomplished by a polypropylene having a broad molecular weight distribution $[M_w/M_n]$ and rather high melting temperature.

Accordingly, the present invention is directed in a first aspect to a biaxially oriented polypropylene (BOPP) film comprising a polypropylene (PP), preferably a propylene homopolymer (H-PP), having a ratio of weight average molecular weight ($M_w$) to number average molecular weight ($M_n$) $[M_w/M_n]$ of at least 9.0, preferably of from 10.0 to 15.0, and a melting temperature ($T_m$) measured by differential scanning calorimetry (DSC) of at least 160° C., preferably of from 164 to 169° C.

Preferably, the biaxially oriented polypropylene (BOPP) film according to this invention has a thermal shrinkage measured in transverse direction (TD) after 5 min at 120° C. of ≤0.3%, preferably of ≤0.2%, and/or has a thermal shrinkage measured after 5 min at 120° C. in machine direction (MD) of from 3.0 to 6.0%.

Thus in a specific embodiment the present invention is directed to a biaxially oriented polypropylene (BOPP) film comprising a propylene homopolymer (H-PP) having a ratio of weight average molecular weight ($M_w$) to number average molecular weight ($M_n$) $[M_w/M_n]$ of from 10.0 to 15.0 and a melting temperature ($T_m$) measured by differential scanning calorimetry (DSC) of from 164 to 169° C., wherein the biaxially oriented polypropylene (BOPP) film has a thermal shrinkage measured in transverse direction (TD) after 5 min at 120° C. of ≤0.3%, preferably of ≤0.2%, and/or has a thermal shrinkage measured after 5 min at 120° C. in machine direction (MD) of from 3.0 to 6.0%.

According to a second aspect, the present invention is directed to a process for the preparation of a biaxially oriented polypropylene (BOPP) film, the process comprises at least the steps of
  a) providing a polypropylene (PP), preferably a propylene homopolymer (H-PP), as defined herein,
  b) stretching the polypropylene (PP), preferably the propylene homopolymer (H-PP), of step a) in machine direction (MD) and transverse direction (TD), wherein the stretching in machine direction (MD) and transverse direction (TD) is carried out in consecutive steps.

It is preferred that step b) is carried out in that the polypropylene (e.g. the propylene homopolymer (H-PP)) of step a) is stretched a) in machine direction (MD) with a draw ratio of ≥3.0, preferably ≥4.0, and/or b) in transverse direction (TD) with a draw ratio of ≥6.0, preferably ≥7.0.

In a third aspect, the present invention is directed to the use of the polypropylene (PP) (e.g. the propylene homopolymer (H-PP)) as defined herein for the preparation of a biaxially oriented polypropylene (BOPP) film.

According to a fourth aspect, the present invention is directed to an article comprising the biaxially oriented polypropylene (BOPP) film as defined herein.

In one embodiment of the present invention, the biaxially oriented polypropylene (BOPP) film comprises a polypropylene (PP) being a propylene homopolymer (H-PP).

In another embodiment of the present invention, the polypropylene (PP) (e.g. the propylene homopolymer (H-PP)) has a) a melting temperature ($T_m$) measured by differential scanning calorimetry (DSC) of at least 162° C., and/or b) a crystallization temperature ($T_c$) measured by differential scanning calorimetry (DSC) of at least 115° C., preferably of at least 118° C.

In yet another embodiment of the second aspect of the present invention, the polypropylene (PP) (e.g. the propylene homopolymer (H-PP)) has a) a melt flow rate $MFR_2$ (230° C.) measured according to ISO 1133 of ≤7.0 g/10 min, preferably of ≤5.0 g/10 min, and/or b) a xylene cold soluble fraction (XCS) determined at 25° C. according ISO 16152 of ≤4.0 wt.-%, preferably in the range of from 1.0 to 4.0 wt.-%, and/or c) an mmmm pentad concentration of ≥94.0%, preferably in the range of from 94.0 to 98.0% determined by NMR-spectroscopy, and/or d) 2,1 erythro regio-defects of below 1.0%, preferably below 0.5%, more preferably below 0.3% determined by $^{13}$C-NMR spectroscopy.

Wherever in the instant invention the amount of defects, i.e. 2,1 erythro regio-defects and stereo-defects (mmmm pentad), are indicated by "%" the average percentage of propylene units in the polymer chain is meant.

In one embodiment of the present invention, the polypropylene (PP) (e.g. the propylene homopolymer (H-PP)) has a polydispersity index of ≥5.0.

In another embodiment of the present invention, the polypropylene (PP) (e.g. the propylene homopolymer (H-PP)) has a ratio of weight average molecular weight ($M_w$) to number average molecular weight ($M_n$) $[M_w/M_n]$ of at least 10.0, preferably from 10.0 to 15.0.

In yet another embodiment of the present invention, the biaxially oriented polypropylene (BOPP) film has (a) a tensile modulus in machine direction (MD) of at least 2 300 N/mm$^2$, and/or (b) a tensile modulus in transverse direction (TD) of at least 4 500 N/mm$^2$, %, preferably the values for the tensile modulus in transverse direction (TD) and in machine direction (MD) are obtained if the polypropylene (PP) (e.g. the propylene homopolymer (H-PP)) when drawn in transverse direction has a drawing temperature (T$_{draw'}$) in the range of the in equation (II)

$$Tm-25 \leq Tdraw' \leq Tm+10 \quad (II),$$

wherein

Tdraw' is the drawing temperature (T$_{draw'}$) in ° C. of the first segment of the drawing zone (DZT) in the oven where the polypropylene (PP) (e.g. the propylene homopolymer (H-PP)) is drawn in transverse direction, wherein further this first segment of the drawing zone (DZT) is defined as the zone where the draw ratio of the drawn polypropylene (PP) (e.g. the propylene homopolymer (H-PP)) is at least 1.1, preferably is in the range of 1.1 to 5.0, more preferably is in the range 1.1 to 4.0, yet more preferably is in the range of 1.1 to 3.5; and Tm is the melting temperature (T$_m$) of the polypropylene (PP) (e.g. the propylene homopolymer (H-PP)) in ° C.

In one embodiment of the present invention, the biaxially oriented polypropylene (BOPP) film has been obtained by a process as defined herein.

Surprisingly, it has been found out that such biaxially oriented polypropylene (BOPP) films have superior properties compared to the films known in the art. Especially, the inventive biaxially oriented polypropylene (BOPP) films have exceptional low shrinkage, especially a low shrinkage in transverse direction.

It should be understood that for the purposes of the present invention, the following terms have the following meaning:

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

When in the following reference is made to preferred embodiments or technical details of the inventive biaxially oriented polypropylene (BOPP) film, it is to be understood that these preferred embodiments and technical details also refer to the inventive process for the preparation of such a biaxially oriented polypropylene (BOPP) film, the inventive use of the polypropylene as well as to the article defined herein and vice versa (as far as applicable). If, for example, it is set out that the polypropylene (PP) of the biaxially oriented polypropylene (BOPP) film comprises a polypropylene (PP) being a propylene homopolymer (H-PP), also the polypropylene (PP) of the inventive process, the inventive use as well as the inventive article preferably comprises a polypropylene (PP) being a propylene homopolymer (H-PP).

In the following the invention will be described in more detail.

In a preferred embodiment of the present invention the polypropylene (PP) is a propylene homopolymer (H-PP). Thus throughout the invention the polypropylene (PP) is in a preferred aspect a propylene homopolymer (H-PP).

It is one requirement of the present invention that the biaxially oriented polypropylene (BOPP) film comprises a polypropylene (PP) as defined in the instant invention. Accordingly, the biaxially oriented polypropylene (BOPP) film preferably comprises at least 80.0 wt.-%, more preferably comprises at least 95.0 wt.-%, yet more preferably consists of, the polypropylene (PP). The biaxially oriented polypropylene (BOPP) film may contain additives, like antioxidants and/or calcium stearate, but preferably no other polymer than the polypropylene (PP). Thus, the remaining part up to 100.0 wt.-% may be accomplished by additives known in the art, like antioxidants and/or calcium stearate. Therefore, it is preferred that, this remaining part, i.e. the part being not the polypropylene (PP), shall be not more than 5.0 wt.-%, preferably not more than 2.0 wt.-%, like not more than 1.0 wt.-%, within the biaxially oriented polypropylene (BOPP) film.

In one preferred embodiment of the present invention, the biaxially oriented polypropylene (BOPP) film contains as polymer component the polypropylene (PP), whereas the remaining part up to 100 wt.-% constitute typical additives but no other polymer.

The term "biaxially oriented polypropylene (BOPP) film" indicates that the film is a biaxially oriented film, i.e. the polypropylene (PP), especially the propylene homopolymer (H-PP), as defined below has been subjected to a stretching process obtaining thereby a biaxially oriented polymer. As indicated above, the biaxially oriented polypropylene (BOPP) film preferably contains the polypropylene (PP), especially the propylene homopolymer (H-PP), as only polymer and thus it is preferably a biaxially oriented polypropylene (BOPP) film made from said polypropylene (PP), especially made from said propylene homopolymer (H-PP).

It is appreciated that the biaxially oriented polypropylene (BOPP) film features an exceptional low shrinkage such as a low shrinkage in transverse direction (TD). Thus, it is one requirement of the present invention that the biaxially oriented polypropylene (BOPP) film has a thermal shrinkage in transverse direction (TD) after 5 min at 120° C. of ≤0.3%. In one embodiment of the present invention, the biaxially oriented polypropylene (BOPP) film has a thermal shrinkage in transverse direction (TD) after 5 min at 120° C. of ≤0.2%. For example, the biaxially oriented polypropylene (BOPP) film has a thermal shrinkage measured after 5 min at 120° C. in transverse direction (TD) in the range from 0.05 to 0.3%, like from 0.05 to 0.2%.

Additionally, the biaxially oriented polypropylene (BOPP) film can have a low shrinkage in machine direction (MD). In one embodiment of the present invention, the biaxially oriented polypropylene (BOPP) film has a thermal shrinkage measured after 5 min at 120° C. in machine direction (MD) of from 3.0 to 6.0%. For example, the biaxially oriented polypropylene (BOPP) film has a thermal shrinkage measured after 5 min at 120° C. in machine direction (MD) of from 3.0 to 5.0%.

Thus, it is preferred that the biaxially oriented polypropylene (BOPP) film has a thermal shrinkage measured after 5 min at 120° C. in transverse direction (TD) of ≤0.3% or ≤0.2%, like in the range from 0.05 to 0.3% or from 0.05 to 0.2% and a thermal shrinkage measured after 5 min at 120° C. in machine direction (MD) in the range from 3.0 to 6.0% or from 3.0 to 5.0%.

Furthermore, it is desired that the biaxially oriented polypropylene (BOPP) film features a high stiffness. Thus, it is preferred that the biaxially oriented polypropylene (BOPP) film has a high tensile modulus in machine direction (MD) and/or transverse direction (TD). Preferably, the biaxially oriented polypropylene (BOPP) film has a high tensile modulus in machine direction (MD) and transverse direction (TD).

In one embodiment of the present invention, the biaxially oriented polypropylene (BOPP) film has a tensile modulus in machine direction (MD) of at least 2 300 N/mm². Preferably, the biaxially oriented polypropylene (BOPP) film has a tensile modulus in machine direction (MD) of from 2 300 to 2 700 N/mm², like from 2 300 to 2 600 N/mm².

Additionally or alternatively, the biaxially oriented polypropylene (BOPP) film has a tensile modulus in transverse direction (TD) of at least 4 500 N/mm². For example, the biaxially oriented polypropylene (BOPP) film has a tensile modulus in transverse direction (TD) of from 4 500 to 6 500 N/mm², like from 4 500 to 6 000 N/mm² or from 4 500 to 5 500 N/mm².

It is preferred that the biaxially oriented polypropylene (BOPP) film has a tensile modulus in machine direction (MD) of at least 2 300 N/mm², preferably from 2 300 to 2 700 N/mm², more preferably from 2 300 to 2 600 N/mm², and a tensile modulus in transverse direction (TD) of at least 4 500 N/mm², preferably from 4 500 to 6 500 N/mm², more preferably from 4 500 to 6 000 N/mm² and most preferably from 4 500 to 5 500 N/mm².

As the biaxially oriented polypropylene (BOPP) film is preferably prepared from the polypropylene (PP), especially from the propylene homopolymer (H-PP), as defined below, the properties given for the polypropylene (PP), especially for the propylene homopolymer (H-PP), are equally applicable for the biaxially oriented polypropylene (BOPP) film, if not specified differently.

The instant polypropylene (PP) is preferably a random propylene copolymer (C-PP) or a propylene homopolymer (H-PP). In one embodiment of the present invention the biaxially oriented polypropylene (BOPP) film comprises a polypropylene (PP) being a propylene homopolymer (H-PP).

The expression propylene homopolymer (H-PP) used in the instant invention relates to a polypropylene that consists substantially, i.e. of at least 99.5 wt.-%, based on the total weight of the polypropylene, preferably of at least 99.6 wt.-%, more preferably of at least 99.8 wt.-%, of propylene units. In one embodiment of the present invention, only propylene units in the propylene homopolymer (H-PP) are detectable.

If the polypropylene (PP) is a random polypropylene copolymer (C-PP), it comprises monomers copolymerizable with propylene, i.e. α-olefins other than propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably, the random polypropylene copolymer (C-PP) comprises, especially consists of, monomers copolymerizable with propylene from the group consisting of ethylene, 1-butene and 1-hexene. More specifically, the random polypropylene copolymer (C-PP) comprises-apart from propylene-units derivable from ethylene and/or 1-butene. In one embodiment of the present invention, the random polypropylene copolymer (C-PP) comprises units derivable from ethylene and propylene only.

The comonomer content in the random polypropylene copolymer (C-PP) is preferably relatively low, i.e. below 5.0 wt.-% based on the total weight of the random polypropylene copolymer (C-PP). In one embodiment of the present invention, the comonomer content is preferably between 0.5 wt.-% and 5.0 wt.-%, more preferably between 0.5 wt.-% and 4.0 wt.-%, even more preferably between 0.5 wt.-% and 3.5 wt.-% and most preferably between 1.0 wt.-% and 3.0 wt.-%, based on the total weight of the random polypropylene copolymer (C-PP).

As already indicated above, the instant polypropylene (PP) is preferably a propylene homopolymer (H-PP).

Preferably, the polypropylene (PP) is isotactic. Accordingly, it is appreciated that the polypropylene (PP) has a rather high pentad concentration (mmmm), i.e. ≥94.0%, determined by NMR-spectroscopy. In one embodiment of the present invention, the polypropylene (PP) has a pentad concentration (mmmm) in the range of from 94.0 to 98.0%, determined by NMR-spectroscopy.

Preferably, the polypropylene (PP) has low amount of regio defects. Accordingly it is preferred that the polypropylene (PP) has 2,1 erythro regio-defects of below 1.0%, preferably below 0.5%, more preferably below 0.3% determined by $^{13}$C-NMR spectroscopy. In one specific embodiments no 2,1-erythro regio-defects are detectable.

The instant polypropylene (PP) preferably features a low amount of xylene cold solubles (XCS), i.e. of ≤4.0 wt.-%, preferably in the range from 1.0 to 4.0 wt.-%, more preferably in the range from 1.5 to 3.5 wt.-% and most preferably in the range from 2.0 to 3.5 wt.-%. These values are especially applicable for the polypropylene (PP) being a propylene homopolymer (H-PP).

Additionally or alternatively, the polypropylene (PP) has a melt flow rate $MFR_2$ (230° C.) measured according to ISO 1133 of ≤7.0 g/10 min, and preferably of ≤5.0 g/10 min. For example, the polypropylene (PP) has a melt flow rate $MFR_2$ (230° C.) measured according to ISO 1133 in the range of 0.5 to 7.0 g/10 min, preferably in the range of 1.0 to 5.0 g/10 min, more preferably in the range of 1.5 to 5.0 g/10 min, and yet more preferably in the range of 1.5 to 4.0 g/10 min.

Preferably, the polypropylene (PP) is a crystalline polypropylene (PP). The term "crystalline" indicates that the polypropylene (PP), i.e. the propylene homopolymer (H-PP) or the random propylene copolymer (C-PP), has a rather high melting temperature. Accordingly, throughout the invention the propylene homopolymer (H-PP) or the random propylene copolymer (C-PP) is regarded as crystalline unless otherwise indicated.

Therefore, the polypropylene (PP) has preferably a ($T_m$) as measured by differential scanning calorimetry (DSC) of at least 160° C., i.e. in the range of from 160 to 170° C., more preferably of at least 162° C., i.e. in the range of from 162 to 170° C., more preferably of at least 164° C., i.e. in the range of from 164 to 169° C. or in the range of from 164 to 168° C. These values are especially applicable for the polypropylene (PP) being a propylene homopolymer (H-PP).

In one embodiment of the present invention, the polypropylene (PP) has a rather high crystallization temperature ($T_c$) as measured by differential scanning calorimetry (DSC). Thus in this embodiment, the polypropylene (PP) has a crystallization temperature ($T_c$) measured by differential scanning calorimetry (DSC) of at least 115° C., preferably of at least 118° C., and more preferably of at least 120° C. Accordingly the polypropylene (PP) has a crystallization temperature ($T_c$) measured by differential scanning calorimetry (DSC) in the range of from 115 to 128° C., preferably in the range of from 118 to 128° C., and more preferably in the range of from 120 to 128° C. These values are especially applicable for the polypropylene (PP) being a propylene homopolymer (H-PP).

Additionally or alternatively, the polypropylene (PP) of the instant biaxially oriented polypropylene (BOPP) film has a relatively high polydispersity index. In one embodiment of the present invention, the biaxially oriented polypropylene (BOPP) film comprises a polypropylene (PP) having a polydispersity index of ≥5.0, preferably of from 5.0 to 9.0, more preferably from 5.0 to 8.0 and most preferably from 5.0 to 7.0.

One characteristic of the present invention is that the polypropylene (PP) of the instant biaxially oriented polypropylene (BOPP) film has a broad molecular weight distribution. It is thus one further requirement of the present invention that the polypropylene (PP) has a ratio of weight average molecular weight ($M_w$) to number average molecular weight ($M_n$) [$M_w/M_n$] of at least 9.0. In one embodiment, the polypropylene (PP) has a ratio of weight average molecular weight ($M_w$) to number average molecular weight ($M_n$) [$M_w/M_n$] of at least 10.0, preferably from 10.0 to 15.0. Preferably, the polypropylene (PP) has a ratio of weight average molecular weight ($M_w$) to number average molecular weight ($M_n$) [$M_w/M_n$] from 10.0 to 14.0 or from 10.0 to 13.0.

In one embodiment of the present invention, the biaxially oriented polypropylene (BOPP) film has a draw ratio of ≥3.0 times, preferably ≥4.0 times, in machine direction (MD) and/or ≥6.0 times, preferably ≥7.0 times, in transverse direction (TD). For example, the biaxially oriented polypropylene (BOPP) film has a draw ratio of from 3.0 to 7.0 or 4.0 to 6.0 times in machine direction (MD), and/or from 6.0 to 12.0 or 7.0 to 11.0 times in transverse direction (TD). Preferably, the biaxially oriented polypropylene (BOPP) film has a draw ratio of from 3.0 to 7.0 or 4.0 to 6.0 times in machine direction (MD) and from 6.0 to 12.0 or 7.0 to 11.0 times in transverse direction (TD).

The polypropylene (PP) is subjected to a film forming process. Any film forming process which is suitable for the preparation of a biaxially oriented polypropylene (BOPP) film can be used.

It is preferred that the biaxially oriented polypropylene (BOPP) film has been obtained by a process as defined below.

Accordingly, another aspect of the present invention is directed to a process for the preparation of a biaxially oriented polypropylene (BOPP) film, the process comprising at least the steps of
a) providing the polypropylene (PP) as defined above,
b) stretching the polypropylene of step a) in machine direction (MD) and transverse direction (TD), wherein the stretching in machine direction (MD) and transverse direction (TD) is carried out in consecutive steps, and wherein preferably the stretching (drawing) in transverse direction is accomplished under the conditions set out below in more detail.

The biaxially oriented polypropylene (BOPP) film can be prepared by conventional drawing/stretching processes known in the art. Accordingly, the process for the preparation of the biaxially oriented polypropylene (BOPP) film according to this invention comprises the use of the polypropylene (PP) as defined herein and its forming into a film preferably by the tenter method known in the art.

The tenter method is in particular a method in which the polypropylene (PP), especially the propylene homopolymer (H-PP), as defined herein is melt extruded from a slit die such as a T-die and cooled on a cooling drum obtaining an undrawn sheet. Typically the cooling drum (chill roll) has a temperature in the range of 80 to 110° C., more preferably in the range of 85 to 100° C., still more preferably in the range of 85 to 95° C., like in the range of 88 to 92° C. Said sheet is pre-heated for example with heated metal rolls and then stretched (drawn) in the length direction between a plurality of rolls over which a difference in peripheral speeds is established. Preferably the difference between the lowest and highest roll speed is 35 to 60 m/min, more preferably 40 to 55 m/min, still more preferably 44 to 52 m/min, wherein the highest roll speed is preferably in the range of 50 to 70 m/min, more preferably in the range of 55 to 65 m/min, like in the range of 57 to 62 m/min and then both edges are gripped with grippers and the sheet is stretched (drawn) in the transverse direction in an oven by means of a tender resulting in a biaxially stretched (drawn) film. The speed when drawn in transverse direction is typically in the range of 50 to 70 m/min, more preferably in the range of 55 to 65 m/min, like in the range of 57 to 62 m/min. The temperature of said stretched (drawn) sheet during the longitudinal stretching (drawing) is preferably controlled in such a way as to be within the temperature range of the melting point of the polypropylene (PP) as defined herein. Accordingly, it is preferred that the drawing temperature ($T_{draw}$) of the polypropylene (PP) when stretched (drawn) in machine direction is in the range of the in equation (I), more preferably in the range of the in equation (Ia), yet more preferably in the range of the in equation (Ib), $$Tm-50 \leq Tdraw \leq Tm-15 \quad (I),$$

$$Tm-40 \leq Tdraw \leq Tm-15 \quad (Ia),$$

$$Tm-35 \leq Tdraw \leq Tm-20 \quad (Ib),$$

wherein

Tdraw is the drawing temperature ($T_{draw}$) in ° C., wherein the drawing temperature ($T_{draw}$) is defined as the temperature (in ° C.) of the first roll (R1) of two successive rolls (R1, R2) of all rolls in the oven consecutively arranged in machine direction where the polypropylene (PP) is drawn in machine direction, wherein further said two successive rolls (R1, R2) when locking in machine direction have as the first pair of successive rolls for the first time a roll speed difference of at least 20 m/min, preferably in the range of 20 to 60 m/min, more preferably in the range of 35 to 55 m/min, still more preferably in the range of 40 to 50 m/min; and Tm is the melting temperature ($T_m$) of the polypropylene (PP) in ° C.

Additionally or alternatively to the inequations of the previous paragraph the drawing temperature ($T_{draw'}$) of the polypropylene (PP) when stretched (drawn) in transverse direction is in the range of the in equation (II), more preferably the in equation (IIa), yet more preferably the in equation (IIb), $$Tm-25 \leq Tdraw' \leq Tm+10 \quad (II),$$

$$Tm-20 \leq Tdraw' \leq Tm+8 \quad (IIa),$$

$$Tm-15 \leq Tdraw' \leq Tm+5 \quad (IIb),$$

wherein

Tdraw' is the drawing temperature ($T_{draw'}$) in ° C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1, preferably is in the range of 1.1 to 5.0, more preferably is in the range 1.1 to 4.0, yet more preferably is in the range of 1.1 to 3.5; and Tm is the melting temperature ($T_m$) of the polypropylene (PP) in ° C.

Preferably the polypropylene (PP) runs through the first segment of the drawing zone (DZT) in the oven where the polypropylene (PP) is drawn in transverse direction in not more than 3.0 sec, more preferably in 0.5 to 2.5 sec, still more preferably in 0.7 to 2.0 sec.

Additionally it is preferred that the polypropylene (PP) runs through whole drawing zone (DZT) in the oven where the polypropylene (PP) is drawn in transverse direction in not more than 5.0 sec, more preferably in 2.5 to 5.0 sec, still more preferably in 2.8 to 4.0 sec, preferably with the proviso that the residence time of the polypropylene (PP) in the whole drawing zone (DZT) is longer than in part of the drawing zone (DZT), i.e. in the first segment of the drawing zone (DZT).

Additionally it is preferred that the drawing temperature ($T_{draw''}$) of the polypropylene (PP) when stretched (drawn) in transverse direction is in the range of the in equation (III), more preferably in the range of the in equation (IIIa), yet more preferably in the range of the in equation (IIIb), $$Tm \leq Tdraw'' \leq Tm+18 \quad (III),$$

$$Tm+1 \leq Tdraw'' \leq Tm+15 \quad (IIIa),$$

$$Tm+2 \leq Tdraw'' \leq Tm+12 \quad (IIIb),$$

wherein

Tdraw" is the drawing temperature ($T_{draw''}$) in ° C. of the heating zone (HZT) in the oven where the polypropylene (PP) is drawn in transverse direction, wherein further the heating zone (HZT) is the zone upstream to the drawing zone (DZT); and Tm is the melting temperature ($T_m$) of the polypropylene (PP) in ° C.

Preferably the draw ratio of the polypropylene (PP) in the heating zone (HZT) is below 1.1, more preferably is 1.0.

Preferably, the biaxially oriented polypropylene (BOPP) film has a draw ratio in machine direction of ≥3.0, preferably ≥4.0, and a draw ratio in transverse direction of ≥6.0, preferably ≥7.0. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length. Subsequently, the sample is stretched in transverse direction where the width of the sample is increasing. Hence, the draw ratio calculates from the current width of the sample over the original width of the sample. Preferably, the draw ratio in machine direction of the biaxially oriented polypropylene (BOPP) film ranges from 3.0 to 7.0 or 4.0 to 6.0 in machine direction (MD). The draw ratio in transverse direction of the biaxially oriented polypropylene (BOPP) film ranges preferably from 6.0 to 12.0 or 7.0 to 11.0.

Thus, it is a requirement of the present process that the stretching in machine direction (MD) and transverse direction (TD) is carried out in consecutive steps. Preferably, the stretching in machine direction (MD) is followed by the stretching in transverse direction (TD).

The thickness of the biaxially oriented polypropylene (BOPP) film can be up to 50.0 μm, however, typically the biaxially oriented polypropylene (BOPP) film has a thickness of not more than 40.0 μm, preferably not more than 30.0 μm, more preferably not more than 25.0 μm, yet more preferably in the range of 1 to 50.0 μm, like in the range of 2.5 to 25.0 μm.

In view of the very good results obtained for the biaxially oriented polypropylene (BOPP) film, a further aspect of the present invention refers to the use of a polypropylene (PP) as defined herein for the preparation of a biaxially oriented polypropylene (BOPP) film, preferably to the use of the polypropylene as defined herein for the preparation of a biaxially oriented polypropylene (BOPP) film under the conditions provided above.

It is appreciated that the biaxially oriented polypropylene (BOPP) film has a thermal shrinkage in transverse direction (TD) after 5 min at 120° C. of ≤0.3%, more preferably of ≤0.2%, still more preferably in the range from 0.05 to 0.3%, like from 0.05 to 0.2%.

Additionally, the biaxially oriented polypropylene (BOPP) film has a low shrinkage in machine direction (MD). In one embodiment of the present invention, the biaxially oriented polypropylene (BOPP) film has a thermal shrinkage in machine direction (MD) after 5 min at 120° C. of from 3.0 to 6.0%, preferably in the range from 3.0 to 5.0%.

Thus, it is preferred that the biaxially oriented polypropylene (BOPP) film has a thermal shrinkage in transverse direction (TD) after 5 min at 120° C. of ≤0.3% or ≤0.2%, like in the range from 0.05 to 0.3% or from 0.05 to 0.2% and a thermal shrinkage in machine direction (MD) after 5 min at 120° C. in the range from 3.0 to 6.0% or from 3.0 to 5.0%.

Furthermore, it is desired that the biaxially oriented polypropylene (BOPP) film features a high stiffness. Thus, it is preferred that the biaxially oriented polypropylene (BOPP) film has a high tensile modulus in machine direction (MD) and/or transverse direction (TD). Preferably, the biaxially oriented polypropylene (BOPP) film has a high tensile modulus in machine direction (MD) and transverse direction (TD).

In one embodiment of the present invention, the biaxially oriented polypropylene (BOPP) film has a tensile modulus in machine direction (MD) of at least 2 300 N/mm², preferably from 2 300 to 2 700 N/mm² and more preferably from 2 300 to 2 600 N/mm².

Additionally or alternatively, the biaxially oriented polypropylene (BOPP) film has a tensile modulus in transverse direction (TD) of at least 4 500 N/mm², preferably from 4 500 to 6 500 N/mm², more preferably from 4 500 to 6 000 N/mm² and most preferably from 4 500 to 5 500 N/mm².

It is preferred that the biaxially oriented polypropylene (BOPP) film has a tensile modulus in machine direction (MD) of at least 2 300 N/mm², preferably from 2 300 to 2 700 N/mm² and more preferably from 2 300 to 2 600 N/mm², and a tensile modulus in transverse direction (TD) of at least 4 500 N/mm², preferably from 4 500 to 6 500 N/mm², more preferably from 4 500 to 6 000 N/mm² and most preferably from 4 500 to 5 500 N/mm².

It is especially preferred that the values provided in the present invention for thermal shrinkage in transverse direction (TD) and in machine direction (MD), as well as the tensile modulus in transverse direction (TD) and in machine direction (MD) are obtained if the polypropylene (PP) when drawn in transverse direction has a drawing temperature ($T_{draw'}$) in the range of the in equation (II), more preferably the in equation (IIa), yet more preferably the in equation (IIb).

Still more preferably the values provided in the present invention for thermal shrinkage in transverse direction (TD) and in machine direction (MD), as well as the tensile modulus in transverse direction (TD) and in machine direction (MD) are obtained if the polypropylene (PP) has (a) a drawing temperature ($T_{draw}$) when stretched (drawn) in machine direction in the range of the in equation (I), more preferably in the range of the in equation (Ia), yet more preferably in the range of the in equation (Ib), and (b) a drawing temperature ($T_{draw'}$) when stretched (drawn) in transverse direction in the range of the in equation (II), more preferably in the range of the in equation (IIa), yet more preferably in the range of the in equation (Ib), and optionally (c) the polypropylene (PP) has a drawing temperature ($T_{draw''}$) when stretched (drawn) in transverse direction in the range of the in equation (III), more preferably in the range of the in equation (IIIa), yet more preferably in the range of the in equation (IIIb).

Further preferred process conditions to achieve the desired properties for the biaxially oriented polypropylene (BOPP) (i.e. for thermal shrinkage in transverse direction (TD) and in machine direction (MD), as well as for the tensile modulus in transverse direction (TD) and in machine direction (MD)) are the speeds as described above.

Subsequently, the biaxially oriented polypropylene (BOPP) film can be treated by corona discharge in air, nitrogen, carbon dioxide gas or any of the mixtures on the surface to be metalized, to improve the adhesive strength to the metal to be deposited, and wound by a winder.

In a further aspect, the present invention is directed to an article comprising the instant biaxially oriented polypropylene (BOPP) film. For example, the article can be a packaging materials, like transparent cups, containers, trays or thin wall packaging or dielectrical films for capacitor or metallisable films.

The instant polypropylene (PP), like the propylene homopolymer (H-PP) or the random propylene copolymer (C-PP), may be produced in a sequential polymerization process.

The term "sequential polymerization process" indicates that the polypropylene is produced in reactors connected in series. Accordingly the present process preferably comprises at least a first polymerization reactor (R1), optionally a second polymerization reactor (R2), and optionally a third polymerization reactor (R3). The term "polymerization reactor" shall indicate that the main polymerization takes place. That means the expression "polymerization reactor" does not include the pre-polymerization reactor employed according to the present invention. Thus, in case the process "consists of" three polymerization reactors, this definition does by no means exclude that the overall process comprises the pre-polymerization step in a pre-polymerization reactor. The term "consist of" is only a closing formulation in view of the main polymerization reactors.

Accordingly, in the at least one polymerization reactor (R1), like in the polymerization reactor (R1) or in the three polymerization reactors (R1), (R2) and (R3), the polypropylene (PP) is produced. Thus the polypropylene (PP) according to this invention preferably comprises at least one polypropylene fraction (PP1), at least two polypropylene fractions (PP1) and (PP2) or at least three fractions (PP1), (PP2) and (PP3). More preferably the polypropylene consists of one polypropylene fraction (PP1) or consists of two polypropylene fractions (PP1) and (PP2) or consists of three polypropylene fractions (PP1), (PP2) and (PP3). In case the polypropylene (PP) comprises more than one polypropylene fraction, these fractions may differ in the molecular weight and thus in the melt flow rate (see below). The term "consist of" with regard to the polypropylene fractions (PP1), (PP2) and (PP3) shall not exclude the option that the final polypropylene (PP) is additivated. The term "consist of" shall only indicate that the polypropylene (PP) shall not contain further polypropylene fractions obtained by the polymerization process. Thus, if for instance, the polypropylene (PP) consists of one polypropylene fraction (PP1) than the polypropylene (PP) consists of the polypropylene fraction (PP1) and optional additives. Of course the additives may also be polymers, as it is for instance the case for α-nucleating agents, or the additives contain polymer carriers. In any case if the polypropylene (PP) consists of the polypropylene fractions (PP1), (PP2) and (PP3) no further polymer in an amount exceeding 5 wt.-% shall be present.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According, to the present invention the slurry reactor (SR) is preferably a (bulk) loop reactor (LR). Accordingly, the average concentration of polypropylene (PP), i.e. the first fraction ($1^{st}$F) of the polypropylene (PP), in the polymer slurry within the loop reactor (LR) is typically from 15 wt.-% to 55 wt.-%, based on the total weight of the polymer slurry within the loop reactor (LR). In one embodiment of the present invention, the average concentration of polypropylene (PP) i.e. of the first fraction ($1^{st}$ F) of the polypropylene (PP) in the polymer slurry within the loop reactor (LR) is from 20 wt.-% to 55 wt.-% and more preferably from 25 wt.-% to 52 wt.-%, based on the total weight of the polymer slurry within the loop reactor (LR).

In case the polymerization process of the present invention comprises more than one polymerization reactor (R1), the polypropylene, i.e. the first polypropylene fraction (PP1) of the polypropylene, of the first polymerization reactor (R1), more preferably polymer slurry of the loop reactor (LR) containing the first polypropylene fraction (PP1) of the polypropylene, is directly fed into the second polymerization reactor (R2), e.g. into a first gas phase reactor (GPR-1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first polypropylene fraction (PP1) of the polypropylene, is led directly to the next stage gas phase reactor.

Alternatively to the previous paragraph, the polypropylene, i.e. the first polypropylene fraction (PP1) of the polypropylene (PP), of the first polymerization reactor (R1), more preferably polymer slurry of the loop reactor (LR) containing the first polypropylene fraction (PP1) of the polypropylene (PP), may be also directed into a flash step or through a further concentration step before fed into the second polymerization reactor (R2), e.g. into the first gas phase reactor (GPR-1). Accordingly, this "indirect feed" refers to a process wherein the content of the first polymerization reactor (R1), of the loop reactor (LR), i.e. the polymer slurry, is fed into the second polymerization reactor (R2), e.g. into the first gas phase reactor (GPR-1), via a reaction medium separation unit and the reaction medium as a gas from the separation unit.

A gas phase reactor (GPR) according to this invention is preferably a fluidized bed reactor, a fast fluidized bed reactor or a settled bed reactor or any combination thereof.

More specifically, the second polymerization reactor (R2), the third polymerization reactor (R3) and any subsequent polymerization reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas any optional subsequent polymerization reactors, like the second polymerization reactor (R2) or third polymerization reactor (R3), are gas phase reactors (GPR). Accordingly for the instant process at least one, preferably one, two or three polymerization reactors, namely a slurry reactor (SR), like a loop reactor (LR), a first gas phase reactor (GPR-1), and a second gas phase reactor (GPR-2) connected in series are used. Prior to the slurry reactor (SR) a pre-polymerization reactor may be placed.

A Ziegler-Natta catalyst (ZN-C), as defined below, is fed into the first reactor (R1) and, if present, is transferred with the polymer (slurry) obtained in the first reactor (R1) into the subsequent reactors, if present. If the process covers also a pre-polymerization step it is preferred that the Ziegler-Natta catalyst (ZN-C) is fed in the pre-polymerization reactor. Subsequently the pre-polymerization product containing the Ziegler-Natta catalyst (ZN-C) is transferred into the first reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The operating temperature in the polymerization reactor (R1), i.e. in the loop reactor (LR), preferably in the range of 60 to 100° C., more preferably in the range of 65 to 90° C., yet more preferably in the range of 70 to 90° C., like in the range of 70 to 80° C.

Typically the pressure in the polymerization reactor (R1), preferably in the loop reactor (LR), is in the range of from 20 to 80 bar, preferably 30 to 60 bar.

The operating temperature of the second and third polymerization reactors ((R2) and (R3)), i.e. of the first and second gas phase reactors ((GPR1) and (GPR2)), —if used—is in the range of 60 to 100° C., more preferably in the range of 70 to 95° C., still more preferably in the range of 75 to 90° C., yet more preferably in the range of 80 to 90° C.

Typically the pressure in the second polymerization reactor (R2), i.e. in the first gas phase reactor (GPR-1), and in the third polymerization reactor (R3), i.e. in the second gas phase reactor (GPR-2), and in any subsequent polymerization reactor, if present, is in the range of from 5 to 50 bar, preferably 15 to 35 bar.

Preferably hydrogen is added in each polymerization reactor in order to control the molecular weight, i.e. the melt flow rate $MFR_2$.

Preferably the hydrogen to propylene feed ratio $[H_2/C_3]$ to the second polymerization reactor (R2) is in the range of 10 to 260 mol/kmol, more preferably in the range of 15 to 180 mol/kmol.

Preferably the average residence time (τ) in the second polymerization reactor (R2) is preferably at least 30 min, more preferably in the range of 30 to 120 min, still more preferably in the range of 35 to 100 min, yet more preferably in the range of 40 to 80 min.

Preferably hydrogen is added in each polymerization reactor in order to control the molecular weight, i.e. the melt flow rate $MFR_2$.

After the polymerization the polypropylene is discharged and mixed with additives as mentioned above.

It is to be noted that in case the polypropylene (PP) is a propylene homopolymer (H-PP) also its fractions are propylene homopolymer fractions. In such a case the individual fractions may differ in the melt flow rate $MFR_2$, but not necessarily. Accordingly, in one embodiment the polypropylene (PP) is a propylene homopolymer (H-PP), wherein each fraction has a similar melt flow rate $MFR_2$, i.e. differ not more than +/−0.7 g/10 min, more preferably differ not more than +/−0.5 g/10 min, from each other.

In case the polypropylene (PP) is a random propylene copolymer (C-PP) at least one of the three fractions is a random propylene copolymer fraction. Accordingly, a random propylene copolymer (C-PP) may also comprise a propylene homopolymer fraction.

As mentioned above in the process for the preparation of the polypropylene as defined above a Ziegler-Natta catalyst (ZN-C) must be used. Accordingly the Ziegler-Natta catalyst (ZN-C) will be now described in more detail.

The pro-catalyst (PC) according to this invention comprises a compound of a transition metal (TM), a compound of a metal (M) which metal is selected from one of the groups 1 to 3 of the periodic table (IUPAC), and an internal electron donor (ID).

Preferably said transition metal (TM) is titanium (Ti), more preferably said compound of transition metal (TM) is a titanium compound (TC) which has at least one titanium-halogen bond.

Preferably the metal compound (M) is a magnesium halide, preferably in active form.

Thus in one specific embodiment of the present invention the pro-catalyst (PC) comprises a titanium compound (TC), which has at least one titanium-halogen bond, and an internal donor (ID), both supported on magnesium halide, preferably in active form.

The internal donor (ID) used in the present invention preferably comprises a compound selected from the group consisting of a succinate, citraconate, a di-ketone and an enamino-imine. The internal donor (ID) may also comprise a mixture of two or three of the compounds selected from the group consisting of succinate, citraconate, di-ketone and enamino-imine. Further the internal donor (ID) may comprise additional compounds to those mentioned before, like phthalate or di-ether. Accordingly in one embodiment the internal donor (ID) consists of a compound selected from the group consisting of succinate, citraconate, di-ketone, enamino-imine and mixture thereof. In another embodiment the internal donor (ID) consists of a succinate and a phthalate or consists of a succinate and a diether. The preferred internal donor (ID) is a succinate or a mixture of a succinate and a phthalate. It is especially preferred that the internal donor (ID) is a succinate only.

Accordingly it is preferred that the internal donor (ID) comprises a compound selected from the group consisting of succinate, citraconate, di-ketone, enamino-imine, and mixtures thereof, preferably comprise a succinate, of at least 80 wt.-%, more preferably at least 90 wt.-%, still more preferably at least 95 wt.-% and even more preferably at least 99 wt.-%, of the total weight of the internal donor (ID). It is, however, preferred that the internal donor (ID) essentially consists, e.g. is, a compound selected from the group consisting of succinate, citraconate, di-ketone, enamino-imine, and mixtures thereof, and preferably is a succinate.

The pro-catalyst (PC) comprising a succinate, citraconate, a di-ketone or an enamino-imine as internal donor (ID) can for example be obtained by reaction of an anhydrous magnesium halide with an alcohol, followed by titanation with a titanium halide and reaction with the respective succinate, citraconate, +di-ketone or enamino-imine compound as internal donor (ID). Such a catalyst comprises about 2 to 6 wt % of titanium, about 10 to 20 wt.-% of magnesium and about 5 to 30 wt.-% of internal donor (ID) with chlorine and solvent making up the remainder.

Suitable succinates have the formula

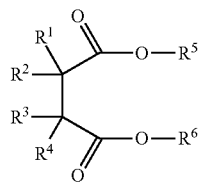

wherein $R^1$ to $R^4$ are equal to or different from one another and are hydrogen, or a $C_1$ to $C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

Suitable citraconates are (di)esters of the citraconic acid and derivatives. The ester moieties, i.e. the moieties derived from an alcohol (i.e. the alkoxy group of the ester), may be identical or different, preferably these ester moieties are identical. Typically the ester moieties are aliphatic or aromatic hydrocarbon groups. Preferred 5 examples thereof are linear or branched aliphatic groups having from 1 to 20 carbon atoms, preferably 2 to 16 carbon atoms, more preferably from 2 to 12 carbon atoms, or aromatic groups having 6 to 12 carbon atoms, optionally containing heteroatoms of Groups 14 to 17 of the Periodic Table of IUPAC, especially N, O, S and/or P.

Suitable di-ketones are 1,3-di-ketones of formula

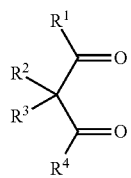

wherein $R^2$ and $R^3$ are equal to or different from one another and are hydrogen, or a $C_1$ to $C_{20}$ linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable enamino-imines have the general formula

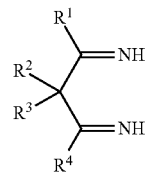

wherein $R^2$ and $R^3$ are equal to or different from one another and are hydrogen, or a $C_1$ to $C_{20}$ linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable diethers are 1,3-diethers of formula

$R^1R^2C(CH_2OR^3)(CH_2OR^4)$ wherein $R^1$ and $R^2$ are the same or different and are $C_1$ to $C_{18}$ alkyl, $C_3$-$C_{18}$ cycloalkyl or $C_7$ to $C_{18}$ aryl radicals or are hydrogen atoms; $R^3$ and $R^4$ are the same or different and are $C_1$ to $C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclopentyl-1,3-dimethoxypropane; 2-isopropyl-2-iso amyl-1,3-dimethoxypropane; 9,9-bis(methoxymethyl)fluorene.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate.

Pro-catalysts (PC) comprising a succinate, a diether, a phthalate etc. as internal donor (ID) are commercially available for example from Basell under the Avant ZN trade name. One particularly preferred Ziegler-Natta catalyst (ZN-C) is the catalyst ZN168M of Basell.

As further component in the instant polymerization process an external donor (ED) must be present. Suitable external donors (ED) include certain silanes, ethers, esters, amines, ketones, heterocyclic compounds and blends of these. It is especially preferred to use a silane. It is most preferred to use silanes of the general formula

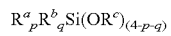

$R^a_pR^b_qSi(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different.

Accordingly a preferred external donor (ED) is represented by the formula

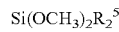

$Si(OCH_3)_2R_2^5$ wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.- butyl, tert.-amyl, neopentyl, cyclopentyl, cyclohexyl, methylcyclopentyl and cycloheptyl.

Another preferred external donor (ED) is represented by the formula

Si(OCH$_2$CH$_3$)$_3$(NR$^x$R$^y$)

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

Specific examples of such silanes are (tert-butyl)$_2$Si(OCH$_3$)$_2$, cyclohexyl methyl dimethoxy silan (cyclohexyl)(methyl)Si(OCH$_3$)$_2$ (referred to as "C donor"), (phenyl)$_2$Si(OCH$_3$)$_2$, dicyclopentyl dimethoxy silane (cyclopentyl)$_2$Si(OCH$_3$)$_2$ (referred to as "D donor") and diethylaminotriethoxysilane (CH$_3$CH$_2$)$_2$NSi(OCH$_2$CH$_3$)$_3$ (referred to as U-donor).

The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminium, like triethylaluminium (TEAL), dialkyl aluminium chloride or alkyl aluminium sesquichloride. In one specific embodiment the co-catalyst (Co) is triethylaluminium (TEAL).

Advantageously, the trialkylaluminium, like the triethyl aluminium (TEAL) has a hydride content, expressed as AlH$_3$, of less than 1.0 wt.-% with respect to the trialkylaluminium, like the triethyl aluminium (TEAL). More preferably, the hydride content is less than 0.5 wt.-%, and most preferably the hydride content is less than 0.1 wt.-%.

Preferably the mol-ratio of co-catalyst (Co) to transition metal (TM) [Co/TM] is at most 130, more preferably in the range of 10 to 130, still more preferably is in the range of 20 to 80, yet more preferably is in the range of 25 to 70, still yet more preferably is in the range of 30 to 60.

Preferably the mol-ratio of co-catalyst (Co) to external donor (ED) [Co/ED] must be below 20.0, more preferably in the range of 0.5 to below 20.0, more preferably is in the range of 1.0 to 15, still more preferably is in the range of 5.0 to 12, yet more preferably is in the range of 6.0 to 11.

Alternatively or additionally to the Co/TM-requirement it is preferred that the molar-ratio of external donor (ED) to transition metal [ED/TM] is below 50, more preferably in the range of more than 1 to below 50, still more preferably in the range of 2 to 30, yet more preferably in the range of 3 to 15.

In the following the present invention is further illustrated by means of examples.

EXAMPLES

A. Measuring Methods

The following definitions of terms and determination methods apply for the above general description of the invention including the claims as well as to the below examples unless otherwise defined.

Calculation of melt flow rate MFR$_2$ (230° C.) of the second polypropylene fraction (PP2):

$$MFR(PP2) = 10^{\left[\frac{\log(MFR(PP1/2)) - w(PP1) \times \log(MFR(PP1))}{w(PP2)}\right]} \quad (I)$$

wherein w(PP1) is the weight fraction [in wt.-%] of the first polypropylene fraction (PP1), w(PP2) is the weight fraction [in wt.-%] of the second polypropylene fraction (PP2), MFR(PP1) is the melt flow rate MFR$_2$ (230° C.) [in g/10 min] of the first polypropylene fraction (PP1), MFR(PP1/2) is the melt flow rate MFR$_2$ (230° C.) [in g/10 min] of the polypropylene obtained after the second polymerization reactor (R2), i.e. of the mixture of the first polypropylene fraction (PP1) and second polypropylene fraction (PP2), MFR(PP2) is the calculated melt flow rate MFR$_2$ (230° C.) [in g/10 min] of the second polypropylene fraction (PP2).

Quantification of Microstructure by NMR Spectroscopy

Quantitative nuclear-magnetic resonance (NMR) spectroscopy was used to quantify the stereo-regularity (tacticity), regio-regularity and comonomer content of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}C\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

$[21e]$ mol $\%=100*(P_{21e}/P_{total})$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$E[\text{mol \%}]=100*fE$

The weight percent comonomer incorporation in the polymer was calculated from the mole fraction according to:

$E[\text{wt \%}]=100*(fE*28.05)/((fE*28.05)+((1-fE)*42.08))$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$XXX[\text{mol \%}]=100*fXXX$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$fXEX=fEEE+fPEE+fPEP$ $fXPX=fPPP+fEPP+fEPE$ where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$R(E)[\%]=100*(fPEP/fXEX)$

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

Rheology:

Dynamic rheological measurements were carried out with Rheometrics RDA-II QC on compression moulded samples under nitrogen atmosphere at 200° C. using 25 mm— diameter plate and plate geometry. The oscillatory shear experiments were done within the linear viscoelastic range of strain at frequencies from 0.01 to 500 rad/s. (ISO 6721-10)

The values of storage modulus (G'), loss modulus (G''), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f'(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)*\omega/[G'(\omega)^2+G''(\omega)^2]$$

$$f''(\omega)=G'(\omega)*\omega/[G'(\omega)^2+G''(\omega)^2]$$

The Polydispersity Index, PI, $PI=10^5/G_c$, is calculated from the cross-over point of $G'(\omega)$ and $G''(\omega)$, for which $G'(\omega_c)=G''(\omega_c)=G_c$ holds.

Number Average Molecular Weight ($M_n$), Weight Average Molecular Weight ($M_w$)

Molecular weight averages Mw and Mn were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

The xylene solubles (XCS, wt.-%): Content of xylene cold solubles (XCS) is determined at 25° C. according ISO 16152; first edition; 2005 Jul. 1.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Tensile modulus in machine and transverse direction were determined according to ISO 527-3 at 23° C. on the biaxially oriented films. Testing was performed at a cross head speed of 1 mm/min.

Shrinkage of the BOPP film was measured in analogy to ISO 11501—"Determination of dimensional change on heating". Film specimens sized 5×10 cm were cut from the BOPP film and placed in an oven in air, for 5 min at 120° C. The relative decrease in length of the so treated film compared to the original film is reported as percent shrinkage.

B. Examples

The catalyst used in the polymerization process for the polypropylene of the inventive example IE1 was the commercial Ziegler-Natta catalyst ZN168M catalyst (succinate as internal donor, 2.5 wt.-% Ti) from Lyondell-Basell prepolymerised with vinylcyclohexane (before used in the polymerisation process) used along with triethyl-aluminium (TEAL) as co-catalyst and dicyclo pentyl dimethoxy silane (D-donor) as external donor.

The aluminium to donor ratio, the aluminium to titanium ratio and the polymerization conditions are indicated in table 1.

TABLE 1

Preparation of example IE1

| Example | | IE1 |
|---|---|---|
| Ti in cat | [wt.-%] | 2.7 |
| Donor | | D |
| TEAL/Ti | [mol/mol] | 30.5 |
| TEAL/Donor | [mol/mol] | 9.9 |
| Prepoly | | |
| Reactor Temp | [° C.] | 30 |
| H2/C3 | [mol/kmol] | 0.620 |
| Loop | | |
| Reactor Temp | [° C.] | 78 |
| H2/C3 | [mol/kmol] | 2.602 |
| split | [wt.-%] | 46 |
| MFR$_2$ | [g/10 min] | 2.2 |
| 1 GPR | | |
| Reactor Temp | [° C.] | 85 |
| H2/C3 | [mol/kmol] | 11.32 |
| split | [wt.-%] | 54 |
| MFR$_2$ | [g/10 min] | 2.6 |
| MFR$_2$ produced in GPR1 | [g/10 min] | 3.0 |
| 2 GPR | | |
| Reactor Temp | [° C.] | 90 |
| H2/C3 | [mol/kmol] | 20 |
| split | [wt.-%] | 19.5 |
| MFR$_2$ | [g/10 min] | 2.85 |
| MFR$_2$ produced in GPR2 | [g/10 min] | 4.6 |

The properties of the unstretched inventive example IE1 as well as of a comparative examples CE1 and CE2 are summarized in Table 2.

TABLE 2

Properties of unstretched samples

| | | Examples | | |
|---|---|---|---|---|
| | Unit | CE1 | CE2 | IE1 |
| MFR$_2$ | [g/10 min] | 2.2 | 2.3 | 3.5 |
| XS | [wt %] | 3.3 | 1.0 | 3.0 |
| mmmm | [%] | 92.3 | 96.6 | 95.2 |
| 2,1 e | [%] | 0 | 0 | 0 |
| $T_m$ | [° C.] | 159.5 | 163.0 | 165.0 |
| $T_c$ | [° C.] | 111.3 | 114.2 | 124.3 |
| PI | [Pas$^{-1}$] | 4.3 | 4.9 | 5.5 |
| $M_w/M_n$ | [—] | 6.1 | 7.1 | 11.0 |

As comparative example CE1 a commercial propylene homopolymer (available as HB311BF from Borealis AG, Austria) has been used.

As comparative example CE2 a commercial propylene homopolymer (available as HC300BF from Borealis AG, Austria) has been used.

BOPP films comprising either the inventive example IE1 or the comparative examples CE1 or CE2 were prepared by using a BOPP pilot line of Bruckner Machinenbau. The used BOPP pilot line closely resembles the tenter frame technology of full scale commercial lines, comprising of (i) a casting unit to create a sheet of un-oriented film, (ii) a machine orientation section to stretch the cast film in machine direction (MD) and (iii) a heated oven for the transverse orientation (TD) operation, yielding the BOPP film.

In Table 3, the applied settings for the preparation of the present BOPP film are outlined.

TABLE 3

Settings for the BOPP film preparation

| | Temperature [° C.] | speed [m/min] | Length of relevant drawing section | Draw ratio | Strain rate ($\epsilon'$) |
|---|---|---|---|---|---|
| Melt | 260 | — | 15 cm$^a$ | 4 | 2 s$^{-1}$ |
| Cast | 90 | 13 | n.a. | 0 | — |
| MDO | 137$^b$ | 13 → 60 | 5 mm$^c$ | 4.6 | ~6 s$^{-1}$ |
| TDO1 | 170 to 176 | 60 | 4.1 m$^d$ | 1.0 | 0.0 |
| TDO2 | 164$^e$ | 60 | 0.8 m$^f$ | 1.1-2.7 | 1 s$^{-1}$ |
| TDO3 | 160-164 | 60 | 3.3 m$^g$ | 1.1-9.0 | 1 s$^{-1}$ |

$^a$distance between chill roll and die exit,
$^b$temperature of the first roll (R1) of the two successive rolls (R1, R2) = [T$_{draw}$],
$^c$distance between last heating roll and first drawing roll
$^d$the length of the heating zone
$^e$temperature of the first segment of the drawing zone (DZT) = T$_{draw'}$
$^f$length of the first segment of the drawing zone (DZT)
$^g$the total length of the drawing zone (DZT)
MDO drawing in machine direction [T$_{draw}$]
TDO1 drawin in transverse direction: heating zone (HZT) [T$_{draw''}$]
TDO2 drawin in transverse direction: first segment of the drawing zone (DZT) [T$_{draw'}$]
TDO3 drawin in transverse direction: total drawing zone (DZT)

Each resin was extruded through a T-die (die-gap 1 mm) and was cast onto the chill roll which was set to 90° C. The melt, before contacting the chill roll, was drawn in air by a factor 4, at a Hencky strain rate of approximately 2 s$^{-1}$, as achieved by the difference in melt output rate and take up speed (13 m/min) A final cast film thickness of ~250 µm was obtained. This cast film was continuously fed to the MDO unit.

The MDO unit of the Brückner pilot BOPP line was composed of 12 rolls, of which the first 7 rolls are used to heat the cast film to the MD stretching temperature (137° C.). Rolls 8-12 were run at 60 m/min, providing the MDO drawing by a factor of 4.6 ($\lambda_{MDO}$). The final rolls of the MDO unit anneal the MDO film at 126° C. The very small gap width between roll 7 and 8 (5-10 mm) causes a very high strain rate of ~6 s$^{-1}$. Table 4 lists the temperature of each MDO roll.

TABLE 4

Temperatures of MDO rolls

| Roll | 1 | 2 | 3 | 4 | 5 | 6 | 7 | 8 | 9 | 10 | 11 | 12 |
|---|---|---|---|---|---|---|---|---|---|---|---|---|
| Temperature[° C.] | 88 | 94 | 102 | 108 | 114 | 120 | 137 | 135 | 110 | 110 | 126 | 126 |

The drawing of the MDO film in TD direction and its transport in MD direction along the length of the TDO oven was accomplished by two counter rotating belts, which run on both sides of the TDO oven, both equipped with several, equidistant clamps. The clamps of each belt, before they enter the TDO oven, automatically open and then close to grab the MDO film which is continuously fed into the TDO oven consisting of a heating-, drawing-, relaxation- and annealing-zone. Each zone is further segmented into shorter sections which can be set to a selected temperature. The temperatures in the TDO oven were typically adjusted to temperatures between 140 and 175° C.

The TDO drawing was accomplished by the increase of the transversal belt-to-belt distance in the drawing zone. The belt-to-belt distance increases linearly, providing a non-constant (decreasing) TD drawing rate of the MDO film. The initial strain rate, calculated from length of the drawing section (3.3 m), line speed (60 m/min) and TD drawing ratio (×9) is ~1 s$^{-1}$.

This is a typical strain rate for full scale lines. In the relaxation zone of the TDO oven, the draw ratio was slightly reduced, via a small decrease in the belt-to-belt TD-distance. The TDO film was collected on a cardboard mandrel and stored for further analyses.

The properties of the biaxially oriented polypropylene (BOPP) films prepared from the polypropylenes of the inventive and comparative examples are summarized in Table 5.

TABLE 5

Biaxially oriented polypropylene (BOPP) films

| | | Thermal shrinkage at 120° C./5 min | | Tensile Modulus | |
|---|---|---|---|---|---|
| | T$_{draw'}$ [° C.] | MD [%] | TD [%] | MD [N/mm$^2$] | TD [N/mm$^2$] |
| CE1 | 164 | 4.82 | 0.86 | 2082 | 4255 |
| CE2 | 166 | 3.28 | 0.38 | 2557 | 5321 |
| IE1 | 164 | 4.42 | 0.12 | 2456 | 5007 |

As can be gathered from the measured details outlined in Table 5, the inventive BOPP film has favourable film properties compared to prior art biaxially oriented polypropylene (BOPP) films. In particular, it can be gathered that the inventive BOPP film shows an exceptional low shrinkage in transverse direction (TD) compared to films made with polypropylenes of the prior art.

The invention claimed is:

1. A biaxially oriented polypropylene (BOPP) film comprising a propylene homopolymer (H-PP) having a ratio of weight average molecular weight (M$_w$) to number average molecular weight (M$_n$) [M$_w$/M$_n$] of from 10.0 to 15.0 and a melting temperature (T$_m$) measured by differential scanning calorimetry (DSC) of from 164 to 169° C., wherein the biaxially oriented polypropylene (BOPP) film has a thermal shrinkage measured after 5 min at 120° C. in transverse direction (TD) of ≤0.3%.

2. The biaxially oriented polypropylene (BOPP) film according to claim 1, wherein propylene homopolymer (H-PP) has a crystallization temperature ($T_c$) measured by differential scanning calorimetry (DSC) of at least 115° C.

3. The biaxially oriented polypropylene (BOPP) film according to claim 1, wherein the propylene homopolymer (H-PP) has a melting temperature ($T_m$) measured by differential scanning calorimetry (DSC) of from 164 to 168° C.

4. The biaxially oriented polypropylene (BOPP) film according to claim 1, wherein the propylene homopolymer (H-PP) has a melt flow rate $MFR_2$ (230° C.) measured according to ISO 1133 of ≤7.0 g/10 min.

5. The biaxially oriented polypropylene (BOPP) film according to claim 1, wherein the propylene homopolymer (H-PP) has a xylene cold soluble fraction (XCS) determined at 25° C. according ISO 16152 of ≤4.0 wt.-%.

6. The biaxially oriented polypropylene (BOPP) film according to claim 1, wherein the propylene homopolymer (H-PP) has
   a) an mmmm pentad concentration of ≥94.0%, as determined by NMR-spectroscopy, and/or
   b) 2,1 erythro regio-defects of below 1.0%, as determined by $^{13}C$-NMR spectroscopy.

7. The biaxially oriented polypropylene (BOPP) film according to claim 1, wherein the propylene homopolymer (H-PP) has a polydispersity index of ≥5.0.

8. The biaxially oriented polypropylene (BOPP) film according to claim 1, wherein the biaxially oriented polypropylene (BOPP) film comprises a propylene homopolymer (H-PP) having a ratio of weight average molecular weight ($M_w$) to number average molecular weight ($M_n$) [$M_w/M_n$] of from 10.0 to 14.0.

9. The biaxially oriented polypropylene (BOPP) film according to claim 1, wherein the biaxially oriented polypropylene (BOPP) film has a thermal shrinkage measured after 5 min at 120° C.
   (a) in transverse direction (TD) of ≤0.2% and/or
   (b) in machine direction (MD) of from 3.0 to 6.0%.

10. The biaxially oriented polypropylene (BOPP) film according to claim 1, wherein the biaxially oriented polypropylene (BOPP) film has a tensile modulus in machine direction (MD) of at least 2 300 N/mm² and/or a tensile modulus in transverse direction (TD) of at least 4 500 N/mm².

11. The biaxially oriented polypropylene (BOPP) film according to claim 2, wherein the propylene homopolymer (H-PP) has a melting temperature ($T_m$) measured by differential scanning calorimetry (DSC) of from 164 to 168° C.

12. The biaxially oriented polypropylene (BOPP) film according to claim 2, wherein the propylene homopolymer (H-PP) has a melt flow rate $MFR_2$ (230° C.) measured according to ISO 1133 of ≤7.0 g/10 min.

13. The biaxially oriented polypropylene (BOPP) film according to claim 2, wherein the propylene homopolymer (H-PP) has a xylene cold soluble fraction (XCS) determined at 25° C. according ISO 16152 of ≤4.0 wt.-%.

14. A process for the preparation of a biaxially oriented polypropylene (BOPP) film according to claim 1, the process comprising at least the steps of
   a) providing a propylene homopolymer (H-PP)) having a ratio of weight average molecular weight ($M_w$) to number average molecular weight ($M_n$) [$M_w/M_n$] of from 10.0 to 15.0 and a melting temperature ($T_m$) measured by differential scanning calorimetry (DSC) of from 164 to 169° C., and
   b) stretching the polypropylene of step a) in machine direction (MD) and transverse direction (TD), wherein the stretching in machine direction (MD) and transverse direction (TD) is carried out in consecutive steps.

15. The process according to claim 14, wherein the propylene homopolymer (H-PP) has
   a) a drawing temperature ($T_{draw'}$) when drawn in transverse direction in the range of the inequation (II), $$Tm-25 \leq Tdraw' \leq Tm+10 \qquad (II),$$

wherein
$T_{draw'}$ is the drawing temperature ($T_{draw'}$) in ° C. of the first segment of the drawing zone (DZT) in the oven where the propylene homopolymer (H-PP) is drawn in transverse direction, wherein further this first segment of the drawing zone (DZT) is defined as the zone where the draw ratio of the drawn propylene homopolymer (H-PP) is at least 1.1; and
Tm is the melting temperature ($T_m$) of the propylene homopolymer (H-PP) in ° C.;
and optionally
   b) a drawing temperature ($T_{draw''}$) when drawn in transverse direction in the range of the inequation (III), $$Tm \leq Tdraw'' \leq Tm+18 \qquad (III),$$

wherein
$T_{draw''}$ is the drawing temperature ($T_{draw''}$) in ° C. of the heating zone (HZT) in the oven where the propylene homopolymer (H-PP) is drawn in transverse direction, wherein further the heating zone (HZT) is the zone upstream to the drawing zone (DZT); and
Tm is the melting temperature ($T_m$) of the propylene homopolymer (H-PP) in ° C.

16. The process according to claim 14, wherein the propylene homopolymer (H-PP) has drawing temperature ($T_{draw}$) when stretched in machine direction in the range of the inequation (I)

$$Tm-50 \leq Tdraw \leq Tm-15 \qquad (I),$$

wherein
$T_{draw}$ is the drawing temperature ($T_{draw}$) in ° C., wherein the drawing temperature ($T_{draw}$) is defined as the temperature (in ° C.) of the first roll (R1) of two successive rolls (R1, R2) of all rolls in the oven consecutively arranged in machine direction where the propylene homopolymer (H-PP) is drawn in machine direction, wherein further said two successive rolls (R1, R2) when locking in machine direction have as the first pair of successive rolls for the first time a roll speed difference of at least 20 m/min; and
Tm is the melting temperature ($T_m$) of the propylene homopolymer (H-PP) in ° C.

17. The process according to claim 14, wherein step b) is carried out in that the propylene homopolymer (H-PP) of step a) is stretched
   a) in machine direction (MD) with a draw ratio of ≥3.0, and/or
   b) in transverse direction (TD) with a draw ratio of ≥6.0.

18. An article comprising a biaxially oriented polypropylene (BOPP) film as defined in claim 1.

* * * * *